United States Patent [19]

Coulin

[11] 4,262,638
[45] Apr. 21, 1981

[54] MUSHROOM VALVE WITH FORCED FLUID COOLING, IN PARTICULAR FOR AN INTERNAL COMBUSTION ENGINE

[75] Inventor: Jean P. Coulin, Enghien-les-Bains, France

[73] Assignee: Societe d'Etudes de Machines Thermiques S.E.M.T., Saint-Denis, France

[21] Appl. No.: 78,676

[22] Filed: Sep. 25, 1979

[30] Foreign Application Priority Data

Oct. 25, 1978 [FR] France .................. 78 30382

[51] Int. Cl.³ ............................................ F02P 1/08
[52] U.S. Cl. ................................ 123/41.41; 137/340
[58] Field of Search ................ 123/188 GC, 41.41; 137/340

[56] References Cited

U.S. PATENT DOCUMENTS 2,819,704  1/1958  Niederman .................. 123/41.41
4,147,138  4/1979  Haug ........................... 123/41.41

FOREIGN PATENT DOCUMENTS 7605266  2/1976  Netherlands .................. 123/41.41

*Primary Examiner*—Ronald B. Cox
*Attorney, Agent, or Firm*—Kenyon & Kenyon

[57] ABSTRACT

A valve, in particular for an internal combustion engine, of the mushroom type cooled by forced circulation of a cooling fluid, comprising a valve stem having at least two longitudinal cooling passage-ways and a valve head being provided with a substantially peripheral cooling passage-way extending in a substantially parallel plane to the lower plane surface of the head and with at least two substantially radial passage-ways connecting the said longitudinal passage-ways to the said peripheral passage-way, wherein said passage-ways provided in the said valve head are constituted by rectilinear passage-way lengths extending from the periphery of said head and opening outwardly, said peripheral passage-way being in the shape of a polygon, and said rectilinear passage-ways are obturated at their outward opening.

15 Claims, 8 Drawing Figures

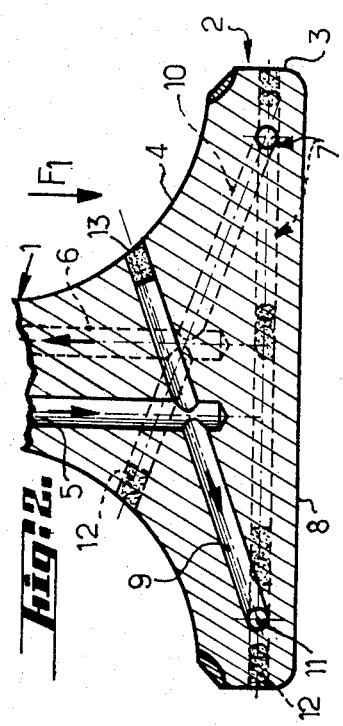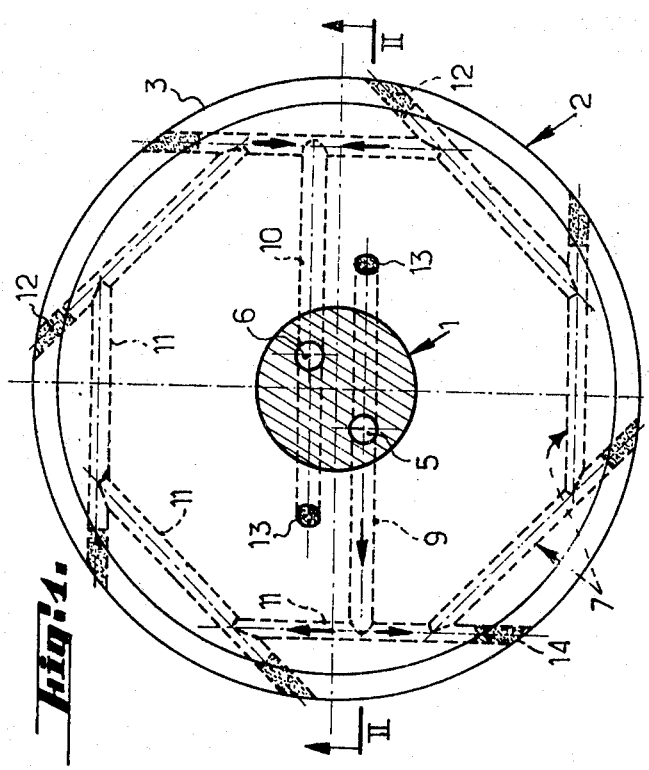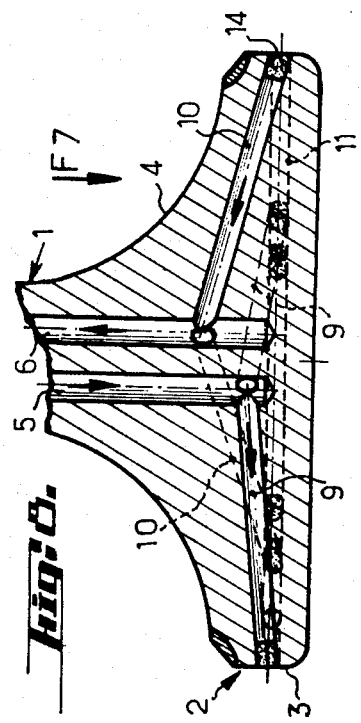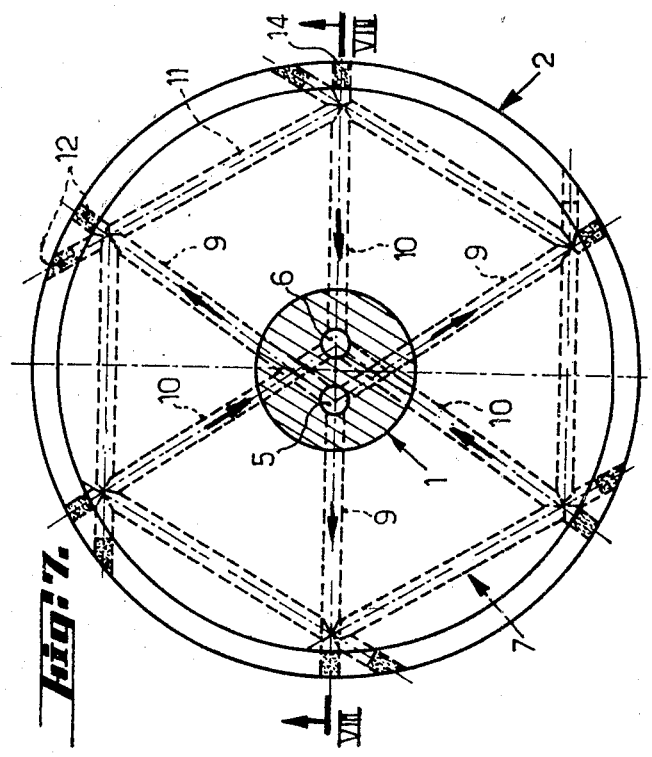

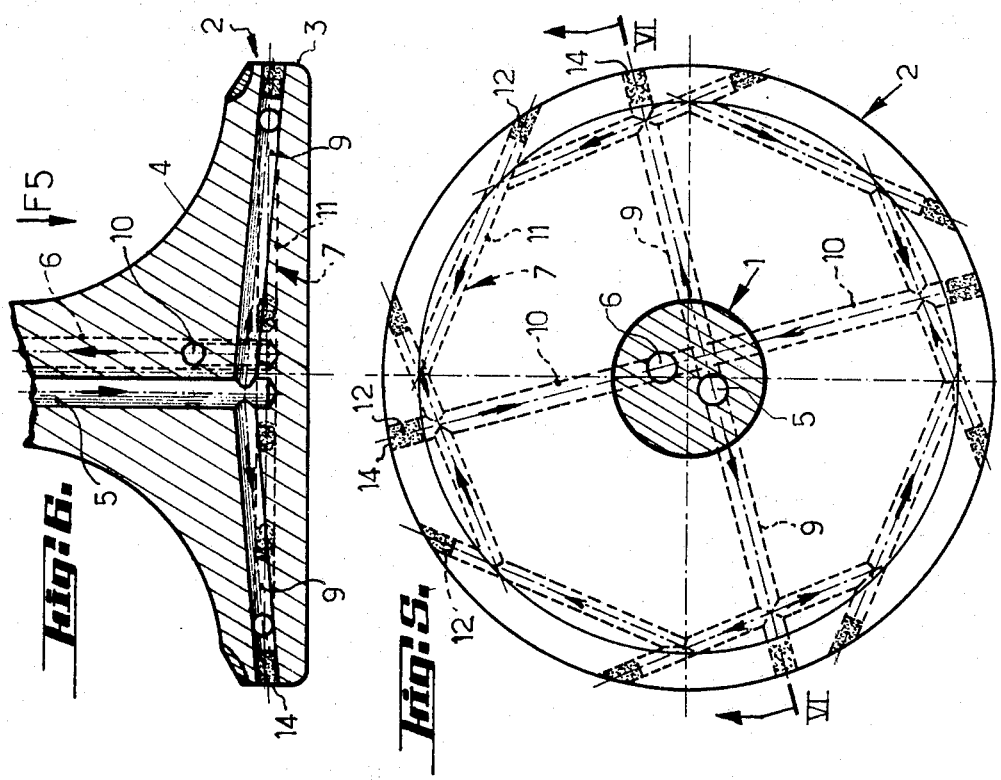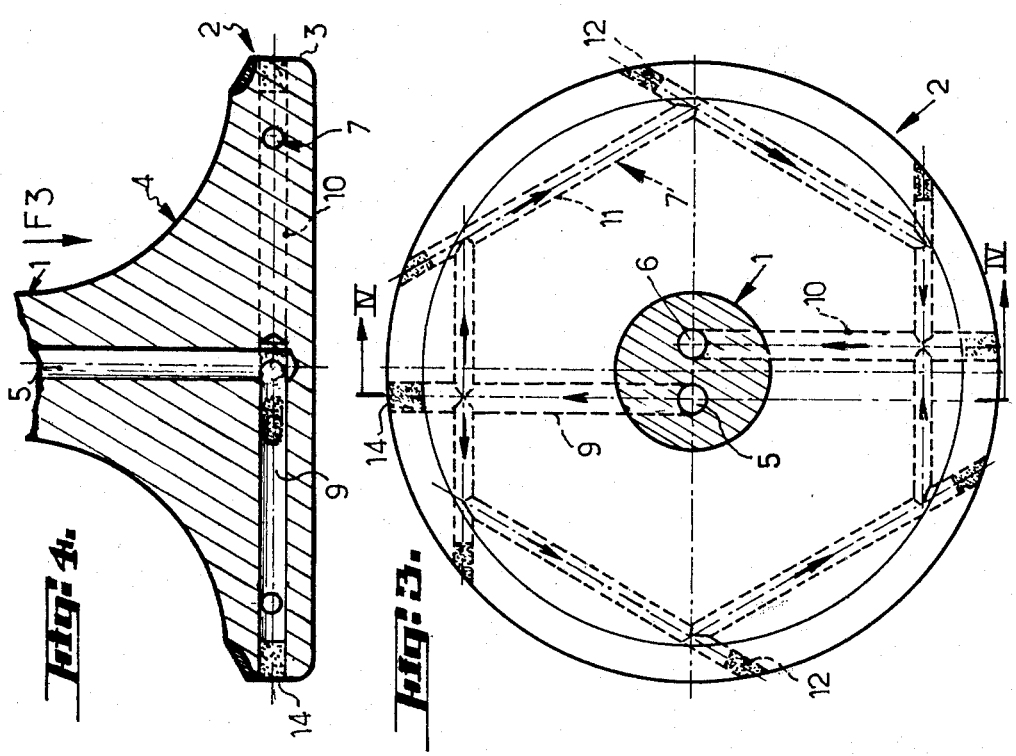

MUSHROOM VALVE WITH FORCED FLUID COOLING, IN PARTICULAR FOR AN INTERNAL COMBUSTION ENGINE

The present invention relates to valves, in particular for internal combustion engines, of the mushroom type, cooled by forced circulation of a cooling fluid. The invention relates more particularly to valves the stem of which comprises at least two longitudinal cooling passage-ways and the head of which is provided with a substantially peripheral cooling passage-way and at least two radial passage-ways connecting the longitudinal passage-ways to the peripheral passage-way.

Known valves of this type are generally composed of several parts assembled by screwing, welding or soldering. In one known valve, the stem also constitutes the central portion of the head, and round the said central portion is secured an annular part forming the outer peripheral portion of the valve head. Such a structure allows the passage-ways to be machined in the form of grooves in the appropriate surfaces, either in one of the parts to be assembled or in both. When the two parts are assembled, the passage-ways are located within the head. Such a valve has the disadvantage that, in order to ensure a good rigidity and fluid-tightness of the assembly, the cooperating surfaces of the parts to be assembled must be machined carefully and the welding or the soldering must be strictly controlled. Such a valve is therefore difficult to manufacture and accordingly expensive.

In another known valve, the valve stem and head are manufactured in one piece and so as to provide a circular cavity in the plane face of the head, at the center thereof. This allows passage-ways in the form of open grooves to be made in the exposed surfaces of the cavity. Thereafter, an appropriately shaped element is inserted into the cavity and secured therein by welding or soldering. Such a valve has the above-described drawbacks, and moreover, the large size of the cavity renders the thermal expansion of the structure obtained uncontrollable.

To avoid the presence of a large cavity at the center of the head, it is also known to manufacture the valve in one piece and to machine deep grooves starting from the plane face of the head and which, after being closed by a weld seam at the plane surface, form the desired internal passage-ways. Also in this valve, however, since the weld seam is long and located at the plane surface of the head, the welding must be performed carefully and the seam controlled strictly and moreover the problem of uncontrolled expansion is not solved since the deep grooves constitute a relatively large cavity anyway.

The purpose of the invention is to provide a valve having none of the aforementioned disadvantages inherent in the known valves.

In order to avoid the said disadvantages, the valve according to the invention, in particular for internal combustion engines, of the mushroom type cooled by forced circulation of a cooling fluid, the valve stem of which comprises at least two longitudinal cooling passage-ways and the valve head of which is provided with a substantially peripheral cooling passage-way extending in a substantially parallel plane to the lower plane surface of the valve head and with at least two radial passage-ways connecting the said longitudinal passage-ways to the said peripheral passage-way, is characterized in that the passage-ways provided in the valve head are formed by rectilinear passage-way lengths extending from the outer surface of the head and opening outwards, and in that the said rectilinear passage-ways are closed at their outward opening.

According to the invention, the radial passage-ways may extend in the plane of the peripheral passage-way or be inclined with respect to the latter.

According to a preferred form of embodiment, the radial passage-ways extend from the external surface of the head region connected with the head and rounded in the axial direction of the valve, and pass through a longitudinal passage-way before opening into the peripheral passage-way.

According to other characterizing features of the invention, the radial passage-ways may start from the cylindrical peripheral surface of the head and several radial passage-ways may be associated with each longitudinal passage-way.

According to the invention, the rectilinear passage-ways in the valve head are obtained by drilling the valve head from its external surface.

According to an important characterizing feature of the invention, the fact that the passage-ways located in the head are constituted by outwardly opening rectilinear passage-way lengths allow the valve to be manufactured integral in one piece. The invention will be better understood and other purposes, characterizing features, details and advantages of the latter will appear more clearly as the following explanatory description proceeds with reference to the appended diagrammatic drawings given solely by way of example, illustrating several forms of embodiment of the invention and wherein:

FIG. 1 is a top view, in the direction of arrow F1 of FIG. 2, of a preferred form of embodiment of the valve according to the invention;

FIG. 2 is a sectional view of a preferred form of embodiment of the invention along the line II—II of FIG. 1;

FIG. 3 is a top view, in the direction of arrow F3 of FIG. 4, of a valve according to a second form of embodiment of the invention;

FIG. 4 is a sectional view upon the line IV—IV of FIG. 3;

FIG. 5 is a top view, in the direction of arrow F5 of FIG. 6, of a third form of embodiment of the invention;

FIG. 6 is a sectional view upon the line VI—VI of FIG. 5;

FIG. 7 is a top view, in the direction of arrow F7 of FIG. 8, of a fourth form of embodiment of a valve according to the invention;

FIG. 8 is a sectional view upon the line VIII—VIII of FIG. 7. The various forms of embodiment of the valve provided by the invention, of the mushroom type cooled by forced circulation of a cooling fluid, are all composed of a valve stem 1 and a valve head 2. The latter comprises a substantially cylindrical portion 3 and a portion 4 curvilinearly tapering to its stem in the axial direction of the valve. Since the invention relates to the structure of the head portion 2, the latter is shown in the Figures with the stem broken away therefrom.

Yet, it appears from the Figures that the stem 1 comprises two longitudinal passage-ways for circulation of the cooling fluid, a fluid-intake passage-way 5 and a fluid-return passage-way 6. In all the forms of embodiment of the invention, the valve head 2 is provided with a substantially peripheral passage-way 7 extending in a substantially parallel plane to the plane lower surface 8 of the valve head. The longitudinal cooling-fluid intake passage-way 5 is connected to the passage-way 7 through at least one radial fluid-intake passage-way 9, and the longitudinal fluid-return passage-way 6 is connected through at least one radial return passage-way 10 to the passage-way 7.

It clearly appears from the Figures that in each form of embodiment of the invention the peripheral passage-way 7 is formed of a series of passage-way lengths, each pertaining to a rectilinear passage-way 11 extending from the cylindrical peripheral surface 3 of the head to at least the adjoining passage-way 11, by following the direction of a chord in the circular plane of the head. Each passage-way 11 has one outwardly opening end and another end opening into the adjacent passage-way 11. The peripheral passage-way is thus of polygonal geometrical shape.

Each radial passage-way 9, 10 is formed of an outwardly opening rectilinear passage-way length starting from the external or peripheral surface of the head and connecting the longitudinal passage-way 5 or 6 to the passage-way 7.

All the rectilinear passage-ways 9, 10, 11 are closed at their outward opening by any appropriate fluid-tight closing means such as for example plugs 12 screwed or fitted into the passage-way ends adjacent to the external surface of the head and secured by welding, soldering, adhesive fastening or the like.

The rectilinear passage-ways 9, 10, 11 may be made in the head by any appropriate means. They may be obtained by drilling the head starting from its external surface.

It appears from the foregoing that the valve according to the invention, owing to the particular arrangement of the passage-ways located in the head, may be manufactured in one integral piece. The invention, however, is not limited to this integral construction of the valve.

After describing the basic characterizing features of the invention, common to all the forms of embodiment, the specific features of each form of embodiment will be set forth hereafter. The differences between these forms of embodiment lie in particular in the number and arrangement of the radial passage-ways 9 and 10 and in the number of rectilinear lengths 11 forming the polygonal passage-way 7.

FIGS. 1 and 2 illustrate the preferred form of embodiment. The passage-way 7 is composed of eight rectilinear passage-way lengths 11. Each longitudinal passage-way 5, 6 communicates with the passage-way 7 through a single, substantially radial passage-way 9, 10. As appears clearly from FIG. 2, each radial passage-way 9, 10 opens outwardly at a location 13 situated in the head portion tapering curvilinearly in the axial direction of the valve 4. Thus, the radial fluid-intake passage-way 9 starts from the location 13 of the external surface of the head, passes through the longitudinal fluid-intake passage-way 5 and opens into the length 11 of the passage-way 7 which is located substantially diametrically opposite to the outwardly opening location 13. It appears from FIG. 2 that the radial passage-ways 9, 10 are inclined with respect to the plane of the passage-way 7. The passage-ways 9, 10 are parallel with one another.

This form of embodiment is advantageous, since it ensures a symmetrical arrangement of the passage-ways in the head, thus allowing a good control of the thermal expansions.

In the form of embodiment illustrated in FIGS. 3 and 4, there are provided two radial passage-ways 9, 10 for the intake and the return of fluid, respectively. Both passage-ways are located in the plane of the passage-way 7. The outward opening 14 of each radial passage-way 9, 10 is therefore located in the cylindrical peripheral surface 3 of the head. Each radial passage-way 9, 10 extends from the periphery of the head to the associated longitudinal passage-way by passing substantially perpendicularly through a rectilinear length 11 of the passageway 7. Both radial passage-ways 9, 10, starting from their longitudinal passage-way 5, 6, respectively, extend in mutually opposite radial directions. The axes of the two radial passage-ways are parallel with one another.

FIGS. 5 and 6 illustrate a third form of embodiment suited for valves of large diameter and for engines working under high temperature conditions. In this form of embodiment, two radial passage-ways 9 are provided to connect the longitudinal fluid-intake passage-way 5 to the passage-way 7, and two radial return passage-ways 10 provide communications between the passage-way 7 and the longitudinal return passage-way 6. It is advantageous but not indispensable that the two radial passage-ways 9 or 10 be located in one and the same vertical plane, on either side, respectively, of their longitudinal passage-way 5 or 6, the vertical plane also containing the axis of the corresponding longitudinal passage-way. The two said planes preferably intersect approximately at right angles as illustrated in FIG. 5.

As all the radial passage-ways open outwardly at locations 14 situated in the cylindrical external surface 3 of the head, as illustrated in FIGS. 5 and 6, this crosswise arrangement of the two pairs of radial passage-ways requires that at least one pair of passage-ways present a greater angular inclination with respect to the plane of the passage-way 7 than the other pair. In the Figures, the most inclined radial passage-ways are the return passage-ways 10. The radial fluid-intake passage-ways 9 are also inclined with respect to the plane of the passage-way 7, but they may also be located in that plane.

FIGS. 7 and 8 show a fourth form of embodiment, wherein each longitudinal passage-way 5, 6 is provided with three substantially radial passage-ways 9, 10 distributed about the longitudinal passage-way so as to define angles that are substantially equal in pairs. All the radial passage-ways open outwardly at 14, at the peripheral external surface 3 of the head. According to FIG. 7, the passage-way 7 is formed of six rectilinear lengths 11 and each radial passage-way 9, 10 passes through the passage-way 7 at the location where two rectilinear passage-way lengths meet one another, therefore at a corner of the polygon.

It appears from FIG. 8 that the openings towards their corresponding longitudinal passage-way of the two sets of three passage-ways are shifted in height along the axis of the valve, so that the inclination with respect to the plane of the passage-way 7 of the radial passage-ways of a set of passage-ways is different from that of the other. According to the Figures, the passage-ways of greater angular inclination are the radial fluid-return passage-ways 10. The radial intake passage-ways 9 are also inclined with respect to the plane of the annular passage-way, but they may also be located within that plane.

In all the forms of embodiment of the invention, the cooling efficiency is improved by an appropriate choice of the cross-sections of the passage-ways.

To this end, the free volume of the longitudinal passage-ways, the radial passage-ways and the polygonal peripheral passage-way are completely filled with forced cooling fluid. The cross-section of each longitudinal, radial or peripheral passage-way is suited to the rate or flow through the particular passage-way considered. The flow velocity of the cooling fluid is uniform throughout the system of passage-ways. In order to ensure this favourable condition it is advisable, in particular, to so choose the cross-sections of the passage-ways that the total flow area at each location of the system is of one and the same value.

For example, in the case of the form of embodiment according to FIGS. 5 and 6, in which two radial fluid-intake passage-ways and two radial return passage-ways are provided, such uniform flow condition may be obtained as follows: assuming all the passage-ways to be of circular cross-section and denoting the diameter of the longitudinal passage-ways by D, each radial passage-way must allow the passage of half the flow of a longitudinal passage-way. Each radial passage-way must therefore have a diameter equal to $D\sqrt{2}$. Since the fluid flow passing through a radial passage-way, on reaching the peripheral passage-way, divides into two equal partial flows of mutually opposite directions, the diameter of the rectilinear lengths of the polygonal passage-way must be equal to $D/2$.

The forms of embodiment which have just been described have been given by way of example only and are capable of many modifications. Thus, the number of passage-ways forming the polygonal passage-way and that of the radial passage-ways may be different. The inclination of the radial passage-ways, e.g. the fluid-intake and/or return passage-ways, instead of having the same inclination with respect to the plane of the annular passage-way may have different angles of inclination. Also, the inclination of the radial fluid-intake passage-ways may be greater than that of the radial return passage-ways.

Therefore, the invention is by no means limited to the forms of embodiment described and illustrated. In particular, it comprises all means constituting technical equivalents to the means described as well as their combinations, should the latter be carried out according to its gist and used within the scope of the following claims.

What is claimed is:

1. A valve, in particular for an internal combustion engine, of the mushroom type cooled by forced circulation of a cooling fluid, comprising a valve stem having at least two longitudinal cooling passage-ways and a valve head being provided with a substantially peripheral cooling passage-way extending in a substantially parallel plane to the lower plane surface of the head and with at least two substantially radial passage-ways connecting the said longitudinal passage-ways to the said peripheral passage-way, wherein said passage-ways provided in the said valve head are constituted by rectilinear passage-way lengths extending from the periphery of said head and opening outwardly, said peripheral passage-way being in the shape of a polygon, and said rectilinear passage-ways are obturated at their outward opening.

2. A valve according to claim 1, wherein said passage-ways extending from the periphery of the valve head are obturated by plugs secured in the outwardly opening ends of the said rectilinear passage-ways by any appropriate means such as screwing or tight fitting and welding, soldering, adhesive fastening.

3. A valve according to claim 1, wherein said radial passage-ways extend substantially in the plane of the said polygonal passage-way.

4. A valve according to claim 1, wherein said radial passage-ways are inclined with respect to the plane of the said polygonal passage-way and extend from the cylindrical external surface of the valve head.

5. A valve according to claim 1, wherein said radial passage-ways extend from the external surface of the valve head region displaying a curvilinear profile in the direction of the valve axis and connecting the cylindrical portion of the latter to said valve stem, and pass through one of said longitudinal passage-ways before opening into said polygonal passage-way.

6. A valve according to claim 1, wherein a single said radial passage-way is associated with each said longitudinal passage-way.

7. A valve according to claim 1, wherein two said radial passage-ways are associated with each longitudinal passage-way and extend from the said longitudinal passage-way preferably in diametrically opposite directions, in that the line of projection on the plane of the said polygonal passage-way of a pair of said radial passage-ways associated with a longitudinal passage-way crosses the said line of projection of the other pair of radial passage-ways associated with the other longitudinal passage-way, and in that the angular inclinations, with respect to the plane of the said polygonal passage-way, of the said pairs of radial passage-ways are different from one another.

8. A valve according to claim 1, wherein three said radial passage-ways are associated with each said longitudinal passage-way, and preferably distributed about the latter in a substantially uniform manner, and in that the angular inclinations, with respect to the plane of the said polygonal passage-way, of the radial passage-ways associated with a longitudinal passage-way are different from those of the radial passage-ways associated with the other longitudinal passage-way.

9. A valve according to claim 8, wherein the said polygonal passage-way has the geometric shape of an hexagon and that each said radial passage-way opens into the said polygonal passage-way at a corner of the said hexagon.

10. A valve according to claim 1, wherein at least the portion forming the head of the said valve is formed in a single, integral piece.

11. A valve according to claim 1, wherein the whole valve is formed in a single, integral piece.

12. A valve according to claim 1, wherein the said rectilinear passage-ways located in the valve head are formed by drilling the head starting from its external surface.

13. A valve according to claim 1, wherein the free volume of the said longitudinal passage-ways, the said radial passage-ways and the said polygonal peripheral passage-way is entirely filled with the cooling fluid in forced circulation.

14. A valve according to claim 13, wherein the cross-section of each longitudinal, radial or peripheral passage-way is suited to the rate of flow passing through the passage-way considered, the velocity of flow of the cooling fluid being uniform from the inlet to the outlet.

15. A valve according to claim 14, wherein the sum of the cross-sectional areas of the said radial passage-ways associated with a longitudinal passage-way is equal to the cross-sectional area of the latter, and is equal to the total cross-sectional area of the said polygonal passage-way, through which the cooling fluid flows in the fluid intake direction or the fluid return direction.

* * * * *